(12) United States Patent
Speece et al.

(10) Patent No.: US 11,904,425 B2
(45) Date of Patent: Feb. 20, 2024

(54) METHOD AND APPARATUS FOR SEPARATING WASTE MATERIAL

(71) Applicant: Compass Systems & Sales, LLC, Barberton, OH (US)

(72) Inventors: Roger Speece, Kirtland, OH (US); Jonathan J. Unger, Tallmadge, OH (US)

(73) Assignee: Compass Systems & Sales, LLC, Barberton, OH (US)

( * ) Notice: Subject to any disclaimer, the term of this patent is extended or adjusted under 35 U.S.C. 154(b) by 0 days.

(21) Appl. No.: 18/058,959

(22) Filed: Nov. 28, 2022

(65) Prior Publication Data

US 2023/0356273 A1 Nov. 9, 2023

Related U.S. Application Data

(60) Provisional application No. 63/339,610, filed on May 9, 2022.

(51) Int. Cl.
| | |
|---|---|
| *B23Q 11/00* | (2006.01) |
| *B27G 3/00* | (2006.01) |
| *B09B 3/80* | (2022.01) |
| *B09B 3/35* | (2022.01) |
| *B09B 101/75* | (2022.01) |
| *B09B 101/85* | (2022.01) |

(52) U.S. Cl.
CPC ............ *B23Q 11/0046* (2013.01); *B09B 3/35* (2022.01); *B09B 3/80* (2022.01); *B27G 3/00* (2013.01); *B09B 2101/75* (2022.01); *B09B 2101/85* (2022.01)

(58) Field of Classification Search
None
See application file for complete search history.

(56) References Cited

U.S. PATENT DOCUMENTS

| | | | | |
|---|---|---|---|---|
| 2003/0187167 A1* | 10/2003 | Adams | ................. | A61K 9/2027 526/287 |
| 2003/0221996 A1* | 12/2003 | Svoronos | ............... | B01D 50/20 209/1 |
| 2011/0140298 A1* | 6/2011 | Politi | ........................ | B07B 1/24 264/121 |
| 2011/0220745 A1* | 9/2011 | Politi | ..................... | B30B 11/16 241/47 |
| 2023/0240495 A1* | 8/2023 | Sun | ....................... | A47L 9/1641 15/347 |

* cited by examiner

*Primary Examiner* — Jacob S. Scott
*Assistant Examiner* — Miraj T. Patel
(74) *Attorney, Agent, or Firm* — Sand, Sebolt & Wernow Co., LPA

(57) ABSTRACT

A self-contained material separator system utilizing a vacuum and blower system, a separator assembly, and a collection assembly to separate and process waste material generated from material handling and processing devices. The material separator may further be self-contained and portable to provide flexibility in the use and deployment thereof.

23 Claims, 12 Drawing Sheets

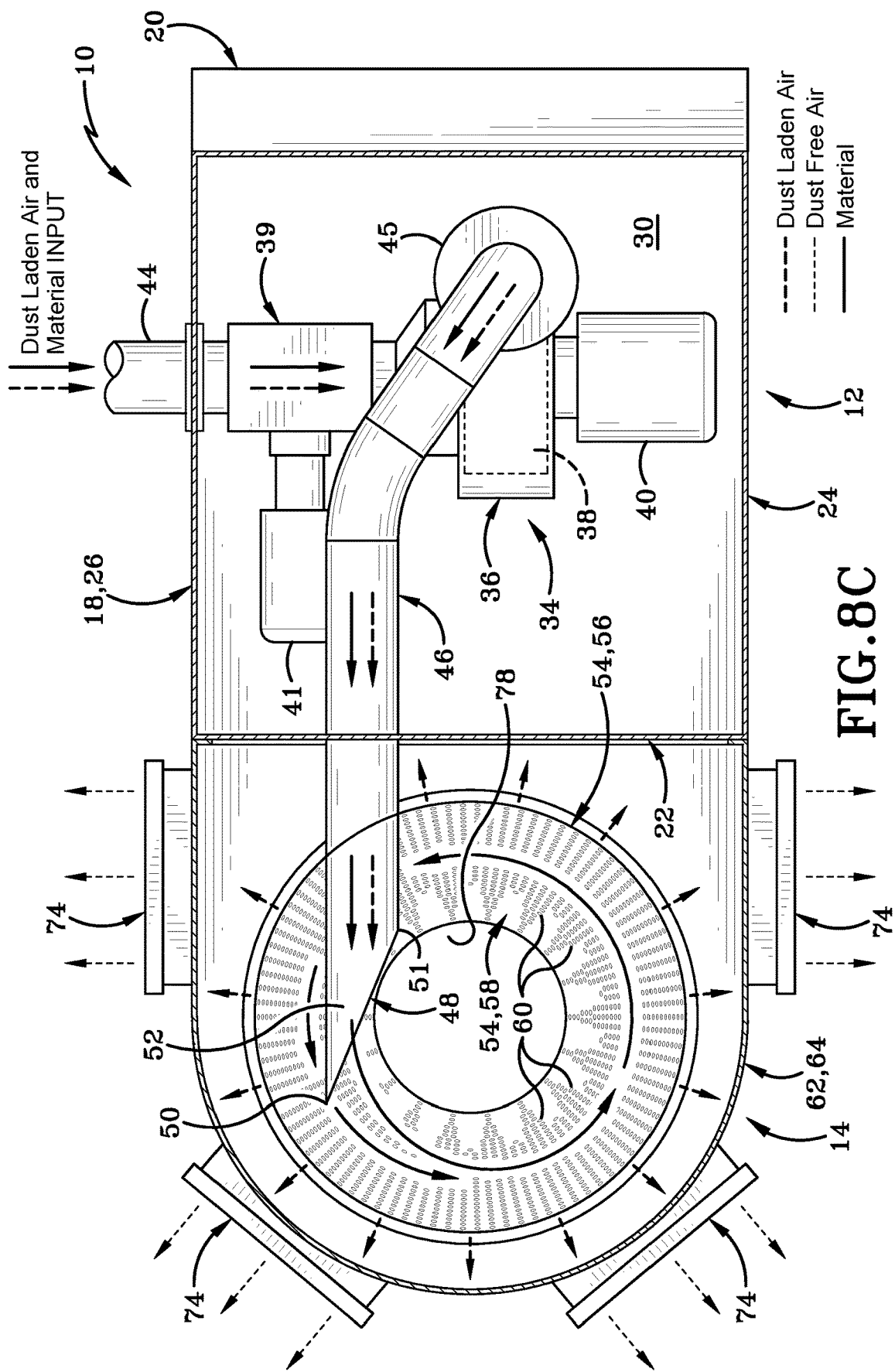

METHOD AND APPARATUS FOR SEPARATING WASTE MATERIAL

TECHNICAL FIELD

The present disclosure relates generally to the field of waste material handling systems. More particularly, in one example, the present disclosure relates to systems and methods for processing and separating waste material. Specifically, in another example, the present disclosure relates to a self-contained waste material handling system utilizing a material handling fan, separator assembly, and collection assembly, to convey and separate waste material out of an airflow.

BACKGROUND

Industrial waste material handling systems, particularly those utilizing vacuum systems to move waste material through the system typically incorporate an air filtration or material separation system to clean the air. In particular, these filtration and separation systems are used to rid the air of the waste material moving through the system. It is common that industrial shops and facilities may incorporate a combination both an air filtration system and a material separation system.

In common large scale applications, these waste material handling systems are typically tied into the facility in which the machines generating the waste are operated. For example, a saw mill or wood processing facility may have a central vacuum system operable to collect sawdust from the wood handling and processing machinery. This centralized vacuum system may then deliver the sawdust and debris to a centralized separation and/or filtration system, before returning the cleaned air back into the facility or the outside environment. Other facilities, such as metal machine shops, plastic material handling shops, paper processing facilities, fabric shops, or the like may likewise employ similar systems.

In smaller scale applications, such as small industrial shops, individual installations (such a hobbyist shops), or in conjunction with individual machines, smaller filtration and/or separation systems may be employed. These smaller systems may be passive filtration systems wherein a filter or collection device is placed in the general region where the waste material is likely to be generated. One example of a passive filtration/collection system would be a dust collection bag attached a miter saw in a home workshop. Other small systems may further incorporate active filtration and collection wherein simple devices employing a vacuum with a filter or catchment component may be placed within the flow of air coming from the equipment generating the waste material. One non-limiting example of a small active system may include hooking a filtered shop vacuum to the dust port of an individual tool, such as a table saw or the like.

Intermediate systems tend to be just larger capacity versions of the smaller systems (e.g. larger and more powerful vacuums) and are often less effective than their larger industrial counterparts and more expensive and unwieldy than their smaller counterparts.

Thus, existing waste material filtration and collection systems are often inefficient in that the smaller, individualized, solutions tend to only collect a portion of the waste material created while requiring frequent filter changes, cleanings, or emptying of catchment containers. While they are more proficient at capturing and separating waste material from the flow of air, larger systems, such as industrial shop-wide or centralized systems, may likewise be inefficient in that they are often expensive to install and maintain, and are tied to a structure or facility itself and therefore are not easily transported between equipment and/or other facilities.

SUMMARY

The present disclosure addresses these and other issues by providing a self-contained material separator system utilizing a vacuum and blower system, a separator assembly, and a collection assembly to separate and process waste material generated from material handling and processing devices. The material separator may further be self-contained and portable to provide flexibility in the use and deployment thereof.

In one aspect, an exemplary embodiment of the present disclosure may provide a waste material processing system comprising: a vacuum operable to draw air containing waste material into a material fan; a conduit to direct the air and waste material from the material fan into a cylindrical receiver of a separator assembly; a plurality of perforations defined in the cylindrical receiver operable to allow the air from the material fan to pass therethrough; and a collection bag operable to retain waste material falling out of the cylindrical receiver into the collection bag; wherein the vacuum, the material fan, the conduit, the separator assembly, and the collection bag are self-contained in a single unit.

In another aspect, an exemplary embodiment of the present disclosure may provide a method of processing waste material comprising: vacuuming air containing waste material into a material fan; directing the air and waste material from the material fan into a cylindrical receiver of a separator assembly; venting the air out of the cylindrical receiver through a plurality of perforations defined in the cylindrical receiver; separating the material waste out of the air; directing the material waste down through a lower conical portion of the cylindrical receiver; and collecting the material waste that falls through the lower conical portion of the cylindrical receiver in a collection bag; wherein the vacuum, the material fan, the conduit, the separator assembly, and the collection bag are self-contained in a single unit.

In yet another aspect, an exemplary embodiment of the present disclosure may provide an apparatus for separating waste material from a flow of air comprising: a housing; a receiver contained within the housing; a central chamber defined through the interior of the receiver, the central chamber having an open bottom; a conduit in operable communication with the central chamber, the conduit operable to deliver a flow of air and waste material into the central chamber; a plurality of perforations defined in the receiver operable to allow air to move from the central chamber into the housing; at least one vent defined through the housing, the at least one vent operable to allow the air from the central chamber to exit the housing into the exterior environment; and a collection assembly operable to collect the waste material as it exits the central chamber through the open bottom thereof.

In yet another aspect, an exemplary embodiment of the present disclosure may provide a method of separating waste material comprising: delivering air containing waste material into a receiver of a separator assembly; causing the air and waste material to swirl within a central chamber defined in the receiver; venting the air out of the receiver through a plurality of perforations defined therein; directing the material waste down through a lower conical portion of the receiver; and collecting the material waste that falls through the lower conical portion of the cylindrical receiver in a collection bag.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

FIG. 8C (FIG. 8C) is an overhead top plan cross sectional operational view of a material separator, according to one aspect of the present disclosure.

Similar numbers refer to similar parts throughout the drawings.

DETAILED DESCRIPTION

Figure 1:
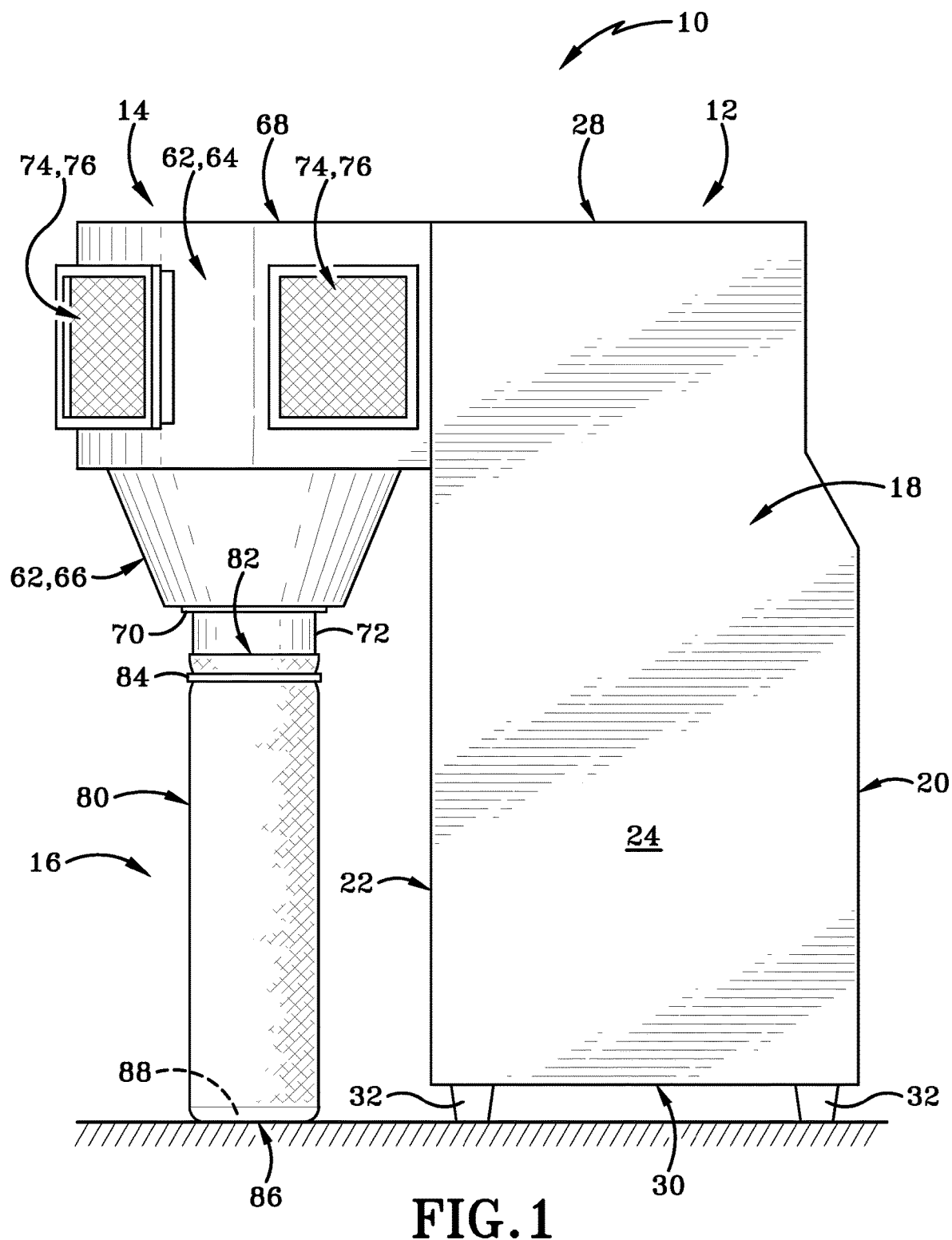
FIG. 1 (FIG. 1) is a front elevation view of a material separator, according to one aspect of the present disclosure.
Figure 2:
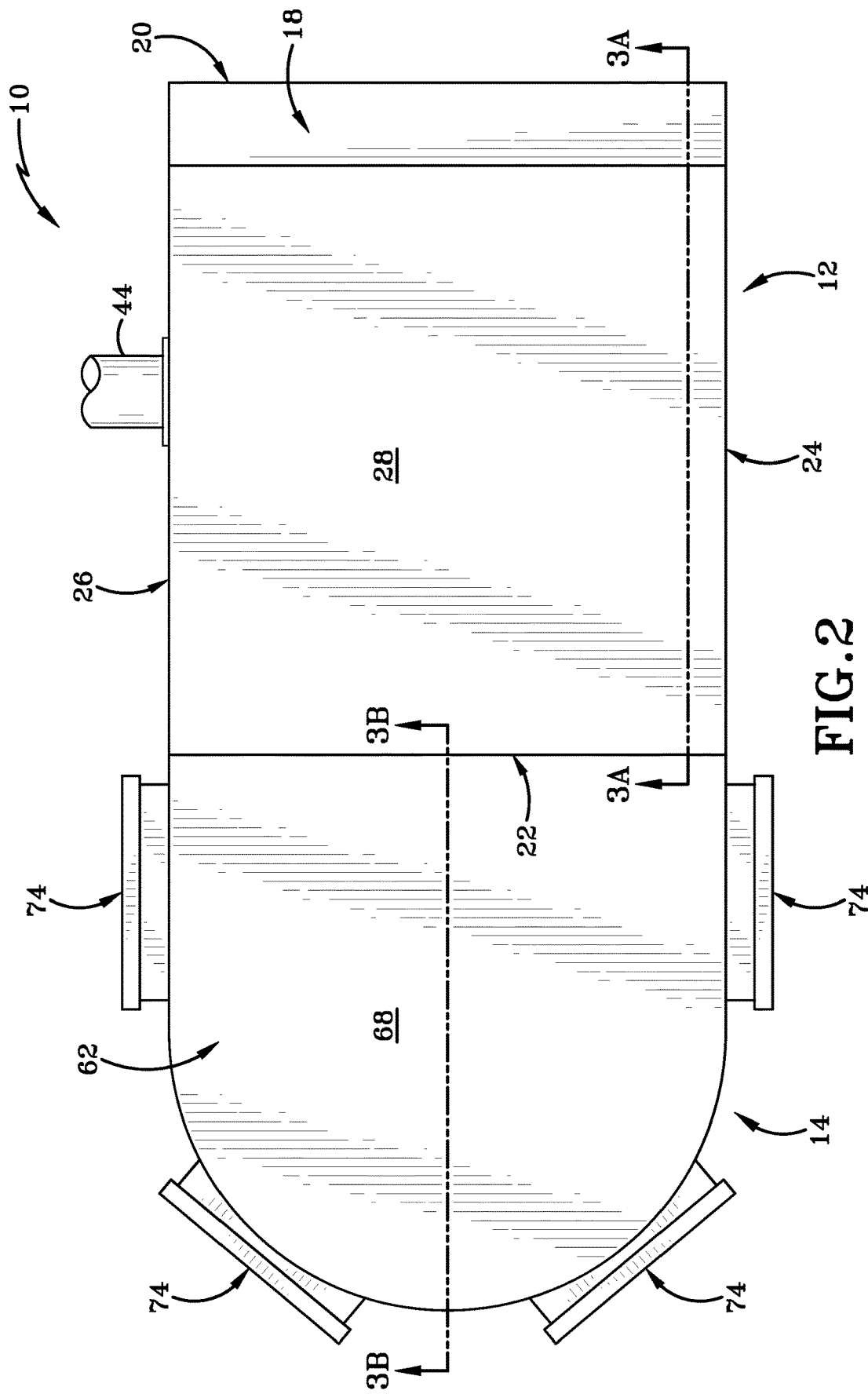
FIG. 2 (FIG. 2) is an overhead plan view of a material separator, according to one aspect of the present disclosure.

With reference to FIGS. 1 and 2, a material separator system or simply material separator, is shown and generally indicated at reference 10. Material separator 10 may include a vacuum and blower assembly 12 (referred to collectively herein as blower assembly 12), a separator assembly 14, and a collection assembly 16.

Figure 3A:
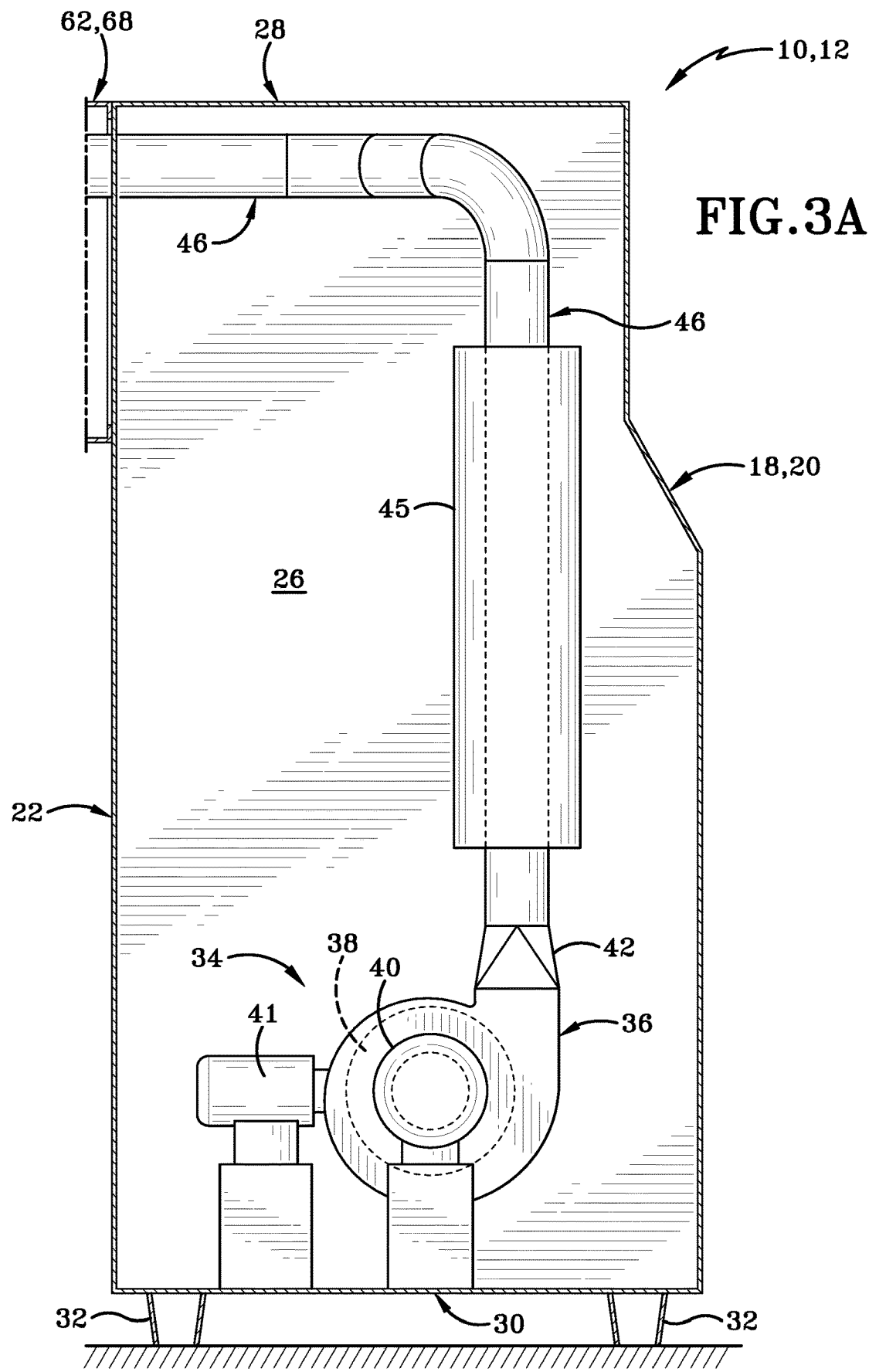
FIG. 3A (FIG. 3A) is a front elevation cross sectional view of a vacuum and blower assembly of a material separator looking in the direction of the arrow indicated in FIG. 2, according to one aspect of the present disclosure.
Figure 4:
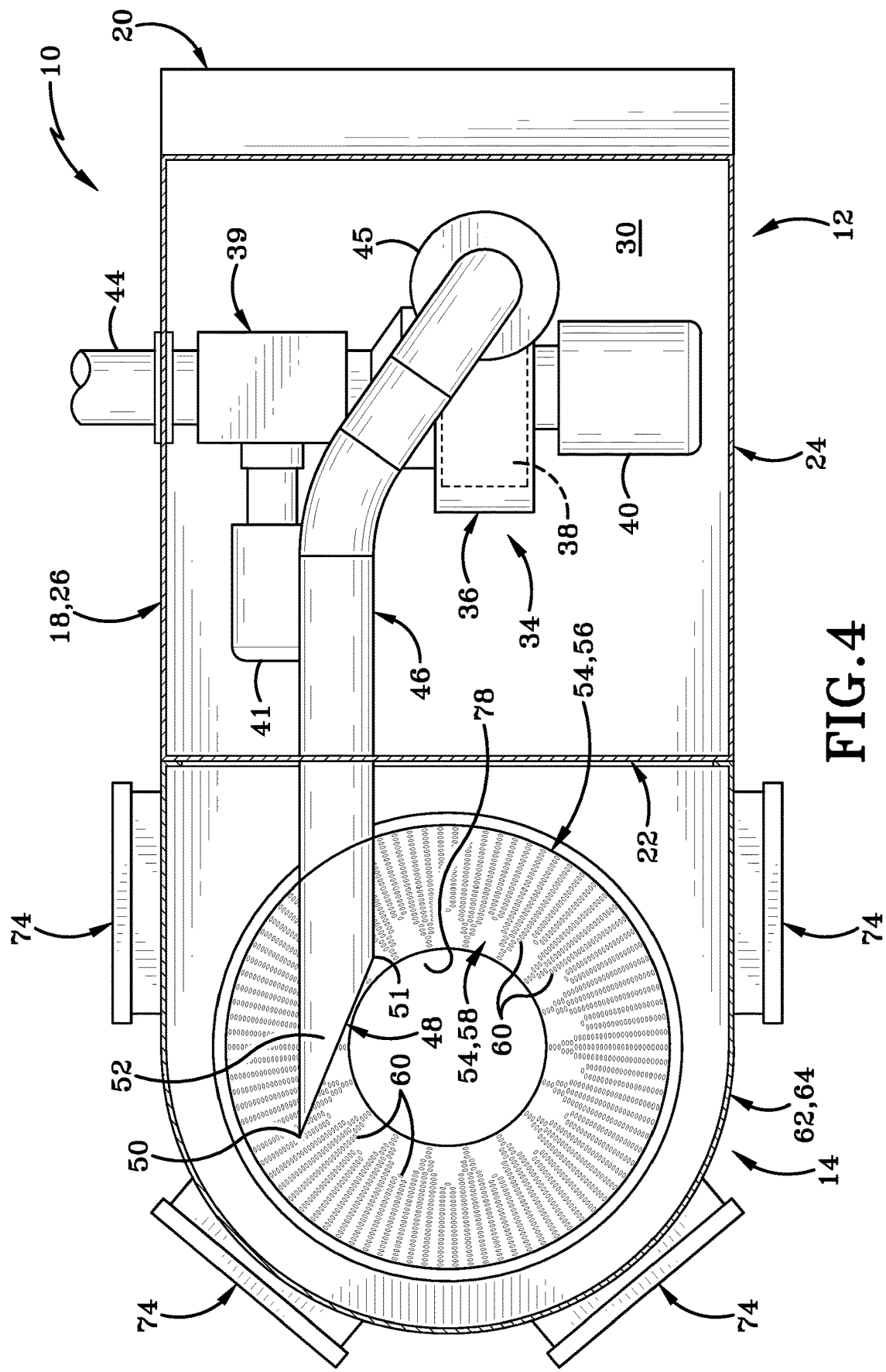
FIG. 4 (FIG. 4) is an overhead cross sectional view of a material separator, according to one aspect of the present disclosure.

With continued reference to FIGS. 1 and 2, but with further reference to FIGS. 3A and 4, blower assembly 12 may include a cabinet or housing 18, which may have a first side 20 spaced transversely apart from a second side 22 and defining a width therebetween; a front 24 spaced apart from a back 26 and defining the depth of housing 18 therebetween and a top 28 spaced vertically apart from a bottom 30 and defining the height of the housing 18 therebetween. Generally speaking, the blower assembly 12 and housing 18 thereof may further define the front, back, side, top, and bottom of material separator 10.

Housing 18 of blower assembly 12 may further include one or more feet 32 on the bottom 30 thereof for support and otherwise to hold housing 18 above a ground surface. According to one aspect, feet 32 may be operable to serve as engagement points for the arms of a forklift or pallet jack, or the like. Housing 18 may be formed of any suitable material including metals, polymers, or the like. According to one aspect, housing 18 may be formed of one or more steel panels, which may be riveted, bolted, screwed, welded, or otherwise fastened together to form housing 18. According to one aspect, housing 18 may include one or more removable panels, access panels, access doors, or the like, to provide suitable access to the interior and the components contained therein for maintenance or replacement, as desired. Housing 18 may further include any suitable or necessary components such as mounting surfaces, mounting brackets, electrical wiring, power supplies, or the like for proper operation of blower fan assembly 34, as discussed further below. Housing 18 may have a generally open interior for housing the blower fan assembly 34 and related components as well as providing clearance for inlet and outlet conduits 44 and 46 to be routed therethrough, as discussed further below.

Blower assembly 12 may include a vacuum 39 and a chopper motor 41 which may draw air laden with waste material through an inlet conduit 44 (best seen in FIGS. 2 and 4) and may further direct that air and waste material into the blower fan assembly 34, or more particularly, into a material chop fan 38 (also referred to herein as a material fan 38), where the material may be reduced in size through interaction with the material chop fan 38, as discussed further below. Vacuum 39 and chopper motor 41 may be any suitable vacuum system operable to draw air and waste material from a separate device and transport it into blower assembly 12. Chopper motor 41 may be any suitable size and type motor, and both vacuum 39 and chopper motor 41 may be scalable according to the power and volume requirements of material separator 10, as dictated by the desired implementation. According to one aspect, the conduit system (including inlet conduit 44 and outlet conduit 46, discussed below) may be sealed as to create vacuum pressure throughout to further facilitate the operation of material separator 10.

Blower fan assembly 34 may include a blower housing 36 and material fan 38 in operable connection with blower motor 40. Blower housing may be a faring or the like operable to contain material fan 38 therein and further operable to direct the flow of air and waste material through the material fan 38 and along though conduit 46 to separator assembly 14, as discussed below. According to one aspect, blower housing 36 may be constructed of any suitable material, including plastics/polymers, metal, or the like, or suitable combinations thereof.

Material chop fan 38 may be a bladed fan which may be constructed to both move air and material through blower fan assembly 34 but also to chop or otherwise reduce larger pieces of waste material down to a smaller, more manageable size as the waste material passes through the blower fan assembly, as discussed further below. The reduction in size of the waste material may further facilitate the filtration and separation thereof out of the flow of air, as discussed below.

As with chopper motor 41, blower motor 40 may be any suitable size and type motor operable to turn material chop fan 38 at sufficient speed and may be scalable according to the power and volume requirements of material separator 10, as dictated by the desired implementation.

Blower fan assembly 34 and vacuum 39 may include or otherwise connect to inlet conduit 44 and/or outlet 46 utilizing one or more coupler 42 components operable to secure the blower housing 36 vacuum 39 to the conduits 44 and/or 46 while maintaining an airtight and/or pressurized seal therebetween to allow for proper pressurization within the conduit lines 44 and 46.

Inlet conduit 44 may be any suitable conduit type, including metal, plastics (such as PVC piping), or the like and may have a suitable internal diameter to handle the required pressure and volume of air and waste material moving therethrough, as dictated by the desired implementation. According to one example, inlet conduit 44 may be a six-inch diameter steel duct style conduit and may include any suitable elbows, junctions, or the like, including flexible conduit sections, as necessary or as desired, provided these additional components or sections are suitable for handling the pressure and volume requirements of the specific implementation.

Outlet conduit 46 may be substantially similar to inlet conduit 44 in that it may be any suitable conduit type, including metal, plastics (such as PVC piping), or the like, and may have a suitable internal diameter to handle the required pressure and volume of air and waste material moving therethrough, as dictated by the desired implementation. According to one example, outlet conduit 46 may be a six-inch diameter steel duct style conduit and may include any suitable elbows, junctions, or the like, including flexible conduit sections, as necessary or as desired, provided these additional components or sections are suitable for handling the pressure and volume requirements of the specific implementation. Outlet conduit 46 may extend up through the interior of housing 18 to transport air and waste material out through the left side 22 of housing 18 and into the separator assembly 14, as discussed further below.

Outlet conduit 46 may further include a noise suppressor 45 which may serve to dampen the noise generated by vacuum 39 and/or blower fan assembly 34. Noise suppressor 45 may be any suitable noise suppression device, including duct silencers, sound attenuators, sound traps, absorptive silencers, mufflers or the like.

With reference to FIGS. 1-4, outlet conduit 46 may extend through the second side 22 of housing 18 and into the separator assembly 14 where it may terminate tangentially within a cylindrical receiver 54 of the separator assembly 14. The terminal end of outlet conduit 46 may be generally open, creating an outlet aperture 48 though which air and waste material may exit into the cylindrical receiver 54. Outlet aperture may be angled or slash cut, creating a tip 50 that extends beyond the edge 51 of aperture 48. The tip may include an extended portion of the conduit sidewall 52, which may help facilitate the movement of air and waste material into the cylindrical receiver 54, as discussed further below with regards to the operation of material separator 10.

With reference to FIGS. 1, 2, 3B, 4, and 7, the separator assembly 14 and collection assembly 16 are shown and will now be discussed. Separator assembly 14 may generally include a cylindrical receiver 54 having an upper portion 56 and a lower portion 58 with a plurality of perforations 60 defined therethrough. Separator assembly 14 may further include a housing 62, which may have an upper section 64 corresponding to upper portion 56 of cylindrical receiver 54 and a lower section 66 corresponding to lower portion 58 of cylindrical receiver 54. Housing 62 may further include a top 68 spaced vertically apart from a sealing gasket 70, which may simultaneously define the bottom of housing 62.

Separator assembly 14 may further include one or more vents 74 defined through the exterior of upper section 64 of housing 62. These vents may allow air moving through the perforations 60 in cylindrical receiver 54 to exit the interior of housing 62 and be returned to the surrounding environment, as discussed below. Vents 74 may further include a filter media, such as a high efficiency particulate air (HEPA) style filter or the like to further filter any smaller dust or material particles that may still be suspended in the air as it exits cylindrical receiver 54 through the perforations 60. Vents 74 may be removable or removably attached to housing 62 to allow easy access to replace and/or clean filters 76, as dictated by the desired implementation thereof. The vents 74 and housing 62 of separator assembly 14 may be best seen in FIG. 7.

Lower section 66 of housing 62 may be angled to complement the lower conical portion 58 of cylindrical receiver 54, but may further be free of vents or apertures. This may cause air exiting through the perforations 60 in the lower portion 58 of cylindrical receiver 54 to be directed upwards and out of vents 74 in the upper section 64 of housing 62, where it can be filtered before being returned into the surrounding environment.

The housing 62 of separator assembly 14 may be formed of any suitable material and may be complementary to the housing 18 of vacuum and blower assembly 12. According to one aspect, the housing 62 of separator assembly may be continuous with the housing 18 of vacuum and blower assembly 12 and may form a single self-contained unit therewith. According to another aspect, the two housings 62 and 18 may be separate but joined together through any suitable fastening mechanism, including permanent, semi-permanent, and temporary connections, as desired. As with housing 18, housing 62 may include one or more removable panels, access panels, access doors, or the like, to provide suitable access to the interior and the components contained therein for maintenance or replacement, as desired.

Figure 5:
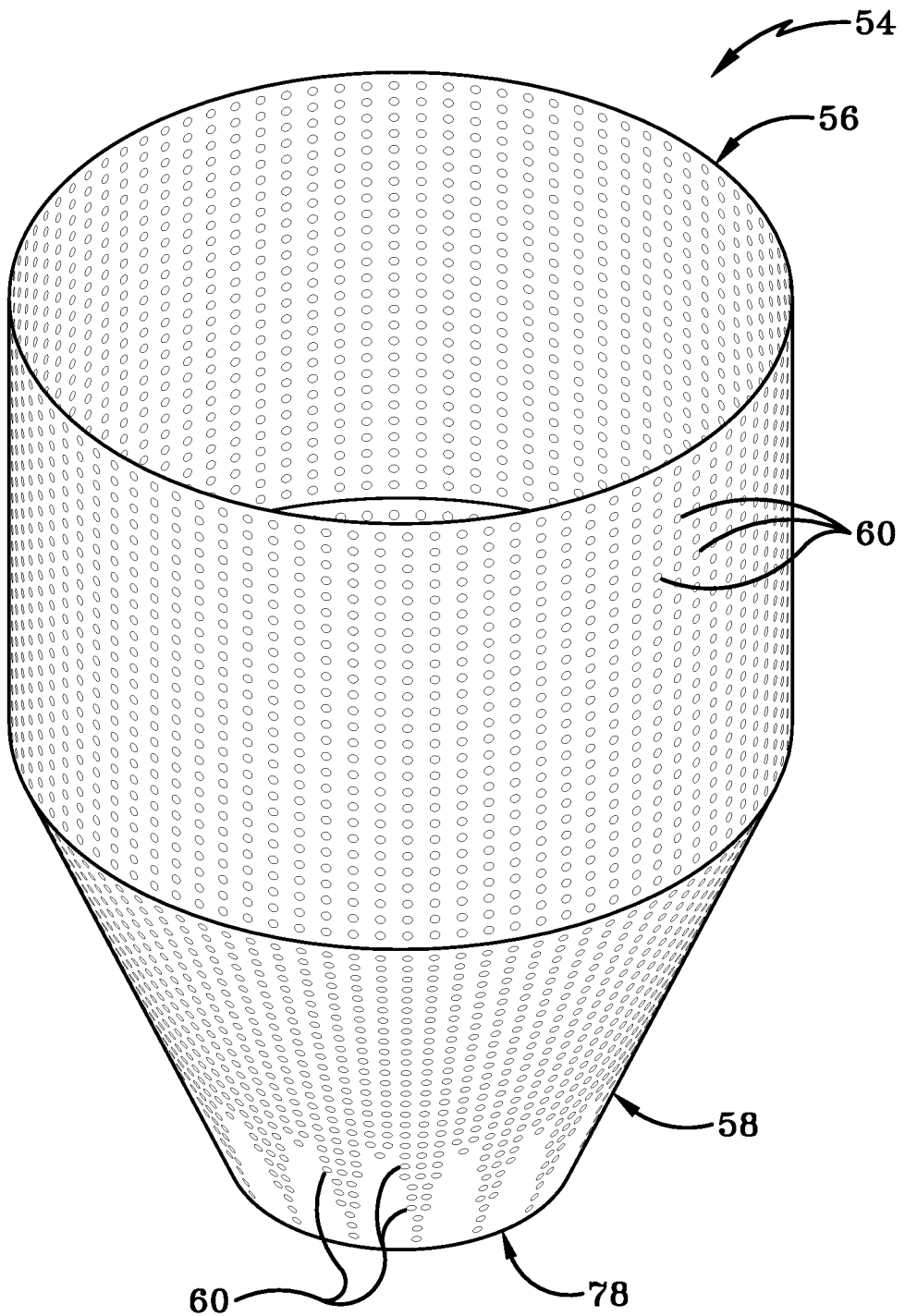
FIG. 5 (FIG. 5) is a front isometric perspective view of a cylindrical receiver of a material separator, according to one aspect of the present disclosure.
Figure 6:
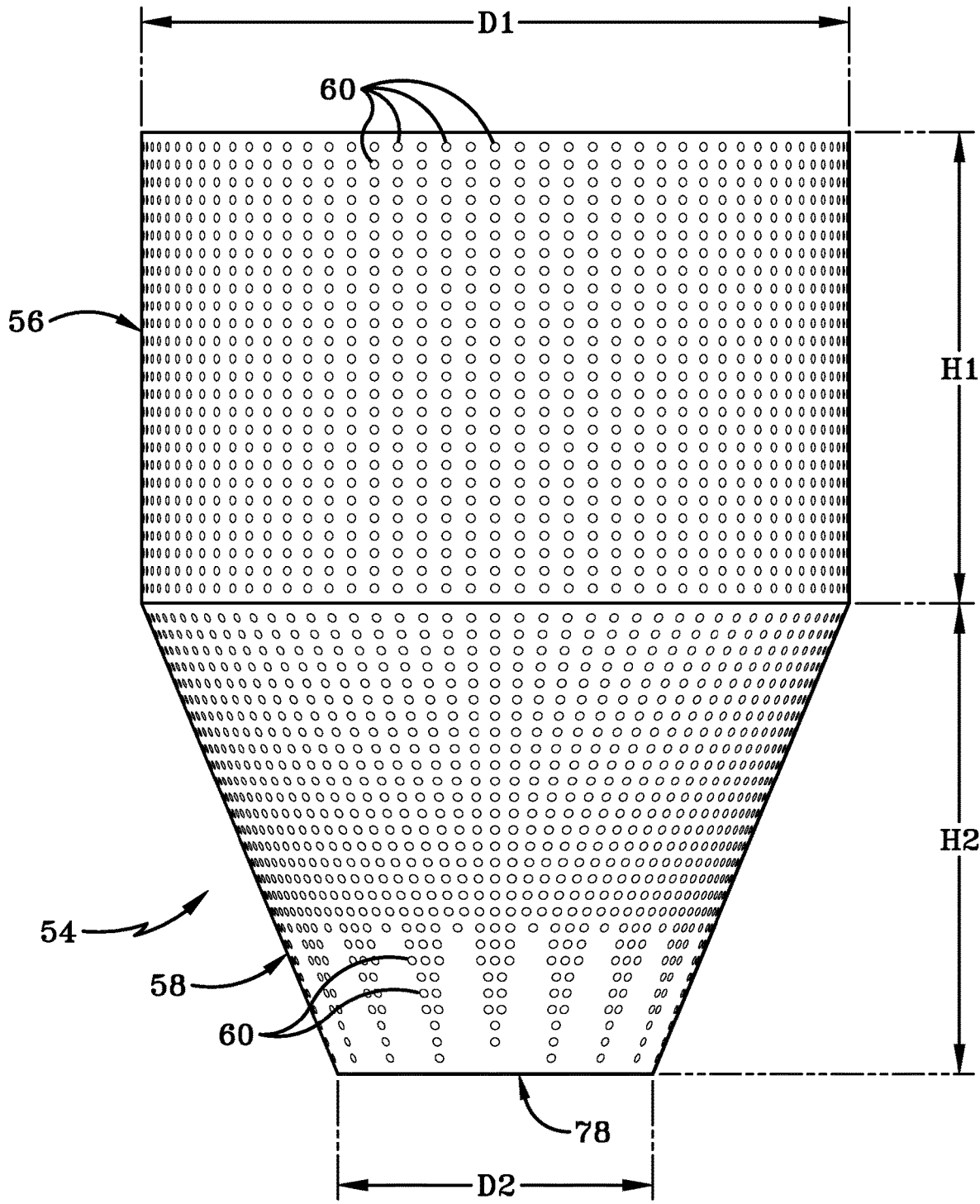
FIG. 6 (FIG. 6) is a front elevation view of a cylindrical receiver of a material separator, according to one aspect of the present disclosure.
Figure 7:
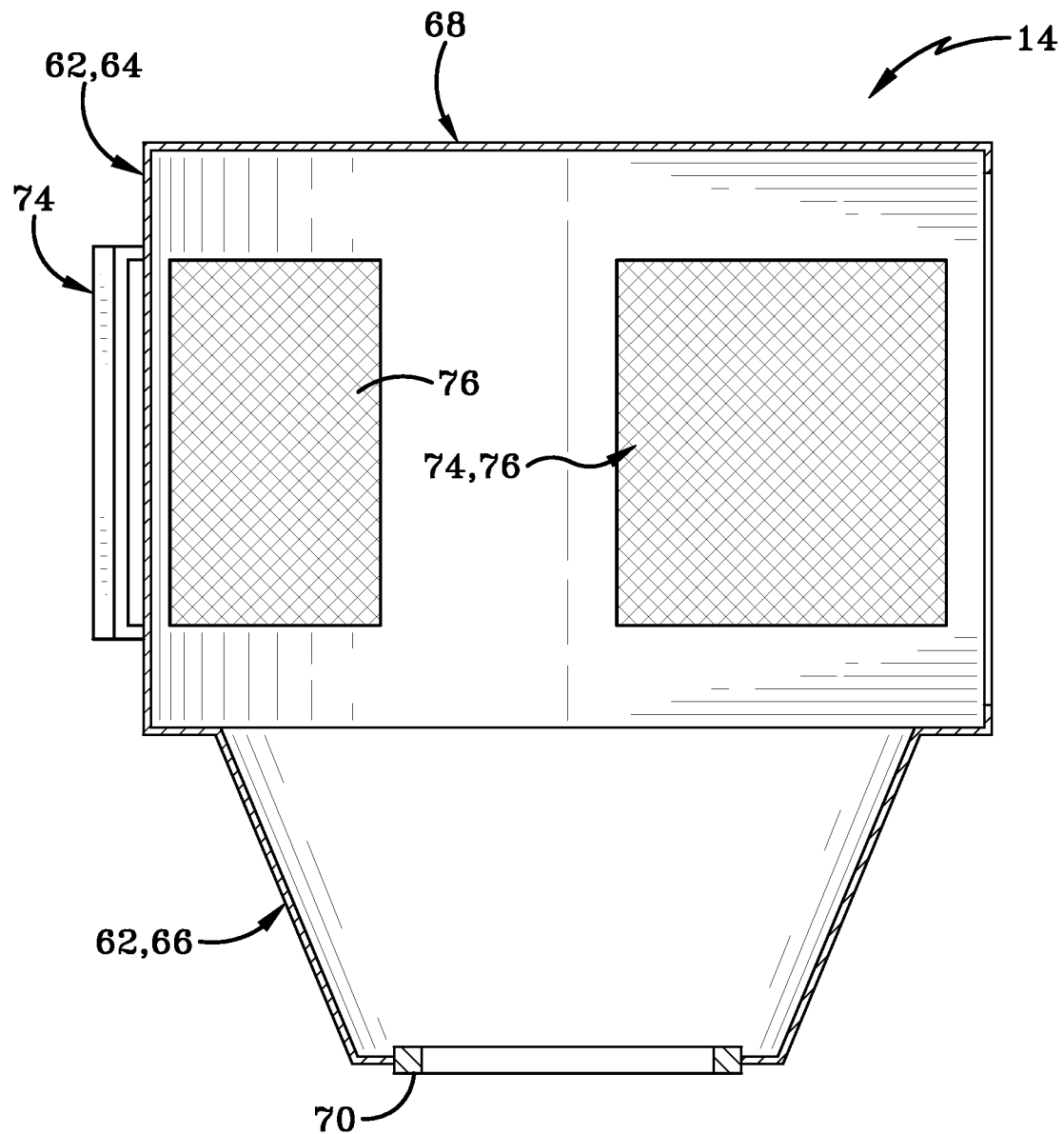
FIG. 7 (FIG. 7) is a front elevation view of a separator assembly of a material separator, according to one aspect of the present disclosure.

With reference to FIGS. 5 and 6, cylindrical receiver 54 is shown and will now be discussed in further detail. Cylindrical receiver 54 may be formed of any suitable material including stainless steel, aluminum, or other metals or polymers as dictated by the desired implementation. Upper portion 56 of cylindrical receiver 54 may be generally cylindrical with vertical walls while lower portion 58 may be conical, tapering downwards from the upper portion 56 towards the sealing gasket 70. This shape, as discussed below, may allow for material being separated out of the airflow moving into separator assembly 14 to swirl within cylindrical receiver 54 and to travel downwards therethrough towards collection assembly 16. The middle of cylindrical receiver 54 may be open and may define a central chamber 78 extending the full height of cylindrical receiver 54. While the top of cylindrical receiver 54 is shown as being open, the top 68 of housing 62 may effectively seal the top of cylindrical receiver 54. The bottom of central chamber 78 may open into a collar 72 which may extend through the sealing gasket 70 defining the bottom of housing 62 and into the collection assembly, as discussed further below.

Cylindrical receiver 54 may be scalable in size to accommodate different volume ranges and material velocities; however, the relative dimensions may be similar. As seen in FIG. 6, upper portion 56 of cylindrical receiver 54 may have a first height H1, which extends from the top of cylindrical receiver 54 to the transition point (Illustrated by the solid line extending across cylindrical receiver 54 in FIGS. 5 and 6) between upper portion 56 and lower portion 58. Similarly, lower portion 58 may have a second height H2 which may extend from the transition point between the two portions to the bottom opening of central chamber 78. Both heights H1 and H2 may be substantially equal, and the sum of which may define the overall height of cylindrical receiver 54. According to one aspect, the total height of cylindrical receiver 54 may be approximately thirty-six inches, with each of height H1 and H2 being eighteen inches. According to another aspect, the total height of cylindrical receiver 54 may be approximately forty-eight inches, with each of height H1 and H2 being twenty-four inches.

Upper portion 56 of cylindrical receiver 54 may have a first diameter D1 which may vary according to the required volume ranges and material velocities of the air and waste material to be separated. Generally speaking, the diameter D1 of upper portion 56 may affect the vent velocity of air and material entering the cylindrical receiver 54 from conduit 46 in that the larger the diameter D1 is, the lower the vent velocity will be for a given volume of air. In turn, increasing the diameter D1 of upper portion 56 and lowering the vent velocity may result in material settling out of the flow of air faster while further minimizing the downdraft of air into the collection assembly 16. According to one aspect, where the height H1 of upper portion 56 is twenty-four inches, the diameter D1 thereof may range from thirty-six to sixty inches.

The lower portion 58 of cylindrical receiver 54, as mentioned above, may be conical and may taper downwards from the transition point between the upper 56 and lower portions 58 of cylindrical receiver 54 down to the bottom opening of central chamber 78. At the transition point, the diameter of lower portion 58 may be the same as the diameter D1 of the upper portion 56, before tapering down to a second diameter D2 which may be the diameter of the bottom opening of central chamber 78. Diameter D2 may likewise be scalable; however, it is contemplated that the second diameter D2 may be relatively constant as to properly allow cylindrical receiver 54 to connect to collar 72 and collection assembly 16. According to one aspect, the second diameter D2 may be approximately sixteen inches.

Upper portion 56 of cylindrical receiver 54 may further be perforated around the full circumference thereof, and for the full height of upper portion 56. The number of actual perforations 60 may be determined by the dimensions of the upper portion 56 and by the desired performance of cylindrical receiver 54 in separating waste material from the air flow. Similarly, lower portion 58 may be perforated around the full circumference thereof, but may have certain sections towards the bottom opening of central chamber 78 that are not perforated for the entire height H2 of lower portion 58. These sections that lack perforations 60 may facilitate the transfer of material from the lower portion 58 into the collection assembly 16. As with the dimensions of cylindrical receiver 54, the number and pattern of perforations 60 may vary according to the implementation requirements.

Figure 3B:
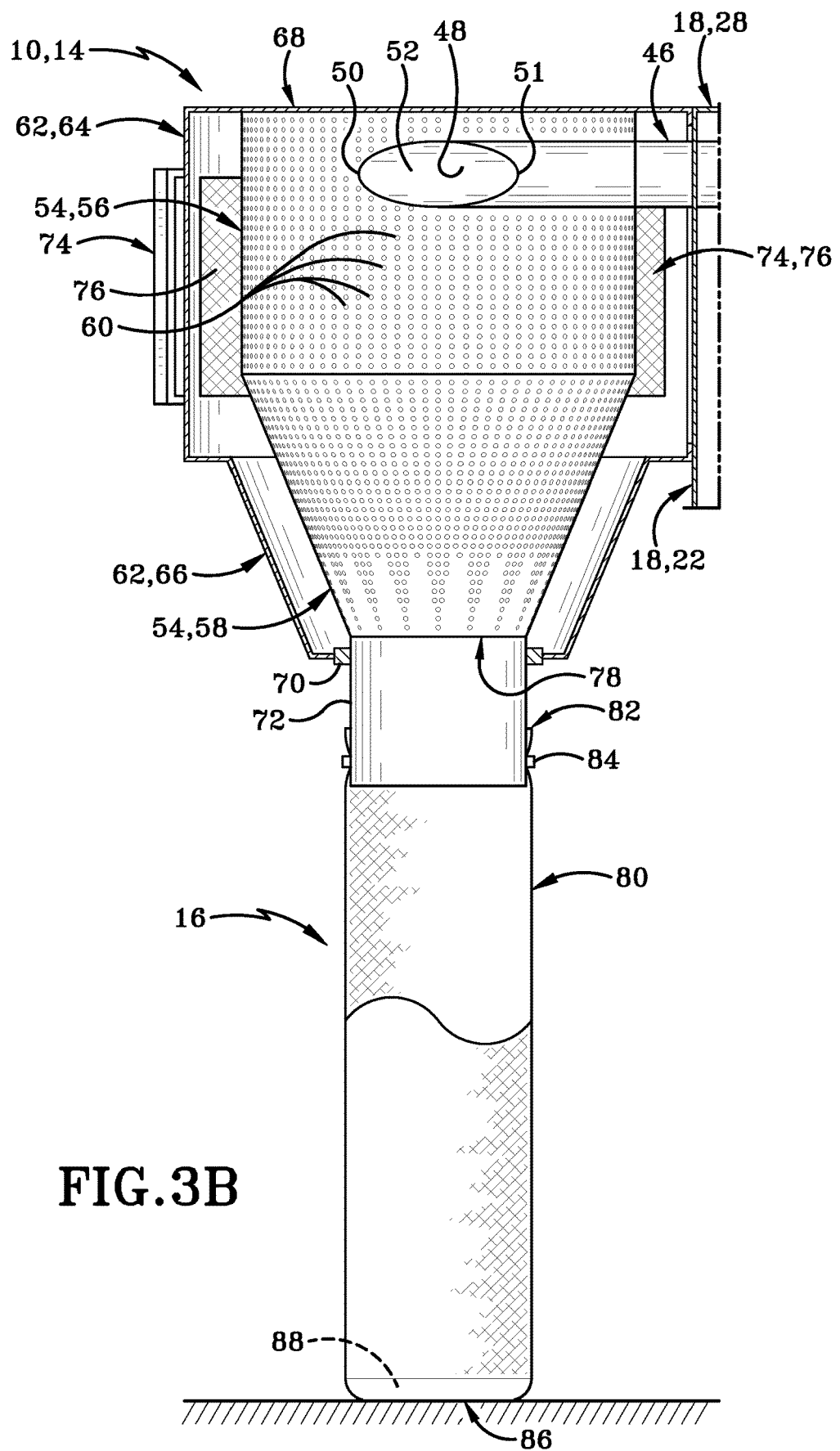
FIG. 3B (FIG. 3B) is a front elevation cross section view of a separator assembly and collection assembly of a material separator looking in the direction of the arrows indicated in FIG. 2, according to one aspect of the present disclosure.

Outlet conduit 46 may enter cylindrical receiver 54 through the side of the upper portion 56 thereof (as seen in FIGS. 3B and 4), discharging the air and waste material into the cylindrical receiver 54 near the top. The curved walls of the cylindrical receiver 54, along with the extended side wall 52 of conduit 46 at outlet aperture 48, may cause the air and waste material to rotate within central chamber 78, which may further facilitate the separation of waste material from the air, as discussed further below.

With reference to FIGS. 1 and 3B, collection assembly 16 will now be described. Collection assembly 16 may generally be any suitable device that may be utilized to capture and retain material therein as it is separated out of the flow of air in separator assembly 14. As shown, collection assembly 16 may be or include a collection bag 80 with an open end 82 which may be fastened to collar 72 by a fastening device 84. Bag 80 may extend generally from the open end 82 to a closed end 86 opposite the open end 82. The closed end 86 may further include a weight or anchor 88 operable to weigh the closed end 86 of bag 80 down and help keep bag 80 stable and in proper position to receive material, as described further below. According to one aspect, the anchor 88 and closed end 86 of bag 80 may rest on the same ground surface supporting material separator 10.

Bag 80 may be formed of any suitable material such as a fine-weave or tight-knit breathable cloth material, or other similar material operable to allow small amounts of air drafting down and out separator assembly 14 of to pass therethrough while trapping or containing fine and waste material particles therein. According to one aspect, bag 80 may be formed of or lined with a filter media, which may be HEPA rated or may further filter any material out of any air entering through open end 82 of bag 80. According to another aspect, bag 80 may be any suitable material or design operable to capture and contain material therein and may include other optional elements or components such as closing mechanisms (e.g. draw strings, zippers, etc.), handles, shoulder straps, or any necessary or desired structural components such as vertical ribs, supporting rings, or other support type structures, as dictated by the desired implementation. According to another aspect, bag 80 may be contained within a sleeve or other type of housing (not shown), as desired or dictated by the desired implementation thereof.

Fastener device 84 may be any suitable device to secure the open end 82 of bag 80 to collar 72 while further allowing it to be removable therefrom. According to one aspect, fastener device 84 may be a strap, a strap clamp, an elastic member, such as a rubber strap, or any other suitable retaining or fastener device 84 operable to secure bag 80 to collar 72. According to another aspect, fastener device 84 may be integrally formed with open end 82 of collection bag 80 and may threadably or otherwise engage a portion of collar 72, as dictated by the desired implementation. Fastener device 84 may therefore be any removable device operable to couple collection bag 80 to collar 72, as described herein.

Having thus described the elements and components of material separator 10 generally, the operation and use therefore will now be described in more detail.

With reference to FIGS. 8A-8D, the operation and use of material separator 10 will now be discussed. As described herein, the material separator 10 discussed using exemplary wood waste material from a sawmill or similar facility. Thus, the example provided is with regard to an air flow containing sawdust and other wood waste material therein. It will be understood that this is intended as an exemplary use of material separator 10 and not as a limiting example thereof. Instead, it is contemplated that material separator 10 may be used to separate any common waste material from a flow of air as desired. Other such examples of waste material may include plastic or polymer waste, such as is produced in the manufacture of plastic materials and in the manufacture of articles made of plastics/polymers; metal swarf or other metal wastes; paper, plastic film, fabric, and/or any other suitable material waste as dictated by the installation parameters and needs.

Accordingly, as shown in FIGS. 8A-8D, a number of arrows are illustrated representing the flow of air and waste materials through material separator 10. Specifically, arrows having a solid tail line represent the flow of waste material, arrows having a tail line of large dashes represent air laden with smaller dust particles (i.e. waster particles that are small enough to pass through the perforations 60 in cylindrical receiver 54), and arrows with tail lines of fine dashes representing dust free or substantially dust free clean air.

Figure 8A:
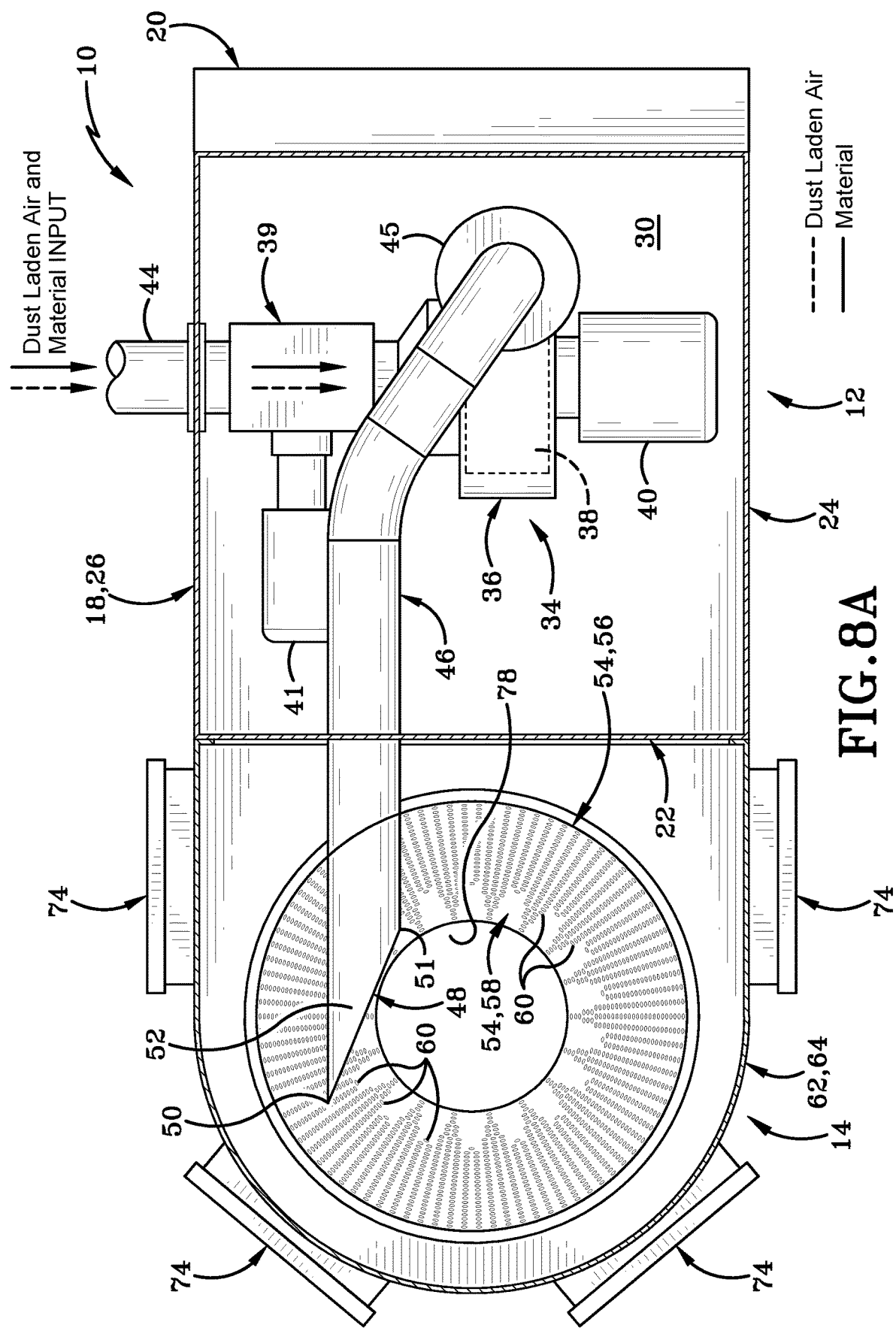
FIG. 8A (FIG. 8A) is an overhead top plan cross sectional operational view of a material separator, according to one aspect of the present disclosure.

With reference first to FIG. 8A, in operation, paper, plastic film, fabric, and/or material laden air and waste material may be drawn into the blower assembly 12 by vacuum 39 and chopper motor 41. As discussed above, material laden air and waste material may originate from slitting lines, edge trim systems, or the like for paper, plastic film, and light gauge metal material. According to the provided example, material laden air may include sawdust and other wood particles from a saw line or the like. Thus, input conduit 44 may be connected to these systems and material may be drawn into the blower assembly via the vacuum 39. As this material laden air and waste material enters into the blower assembly 12, the material laden air and waste material will pass through material fan 38 where larger pieces of waste material may be reduced in size by the blades of the material fan 38. The material fan 38 will then further facilitate the movement of material laden air and waste material through the blower housing 36 and into the outlet conduit 46.

Figure 8B:
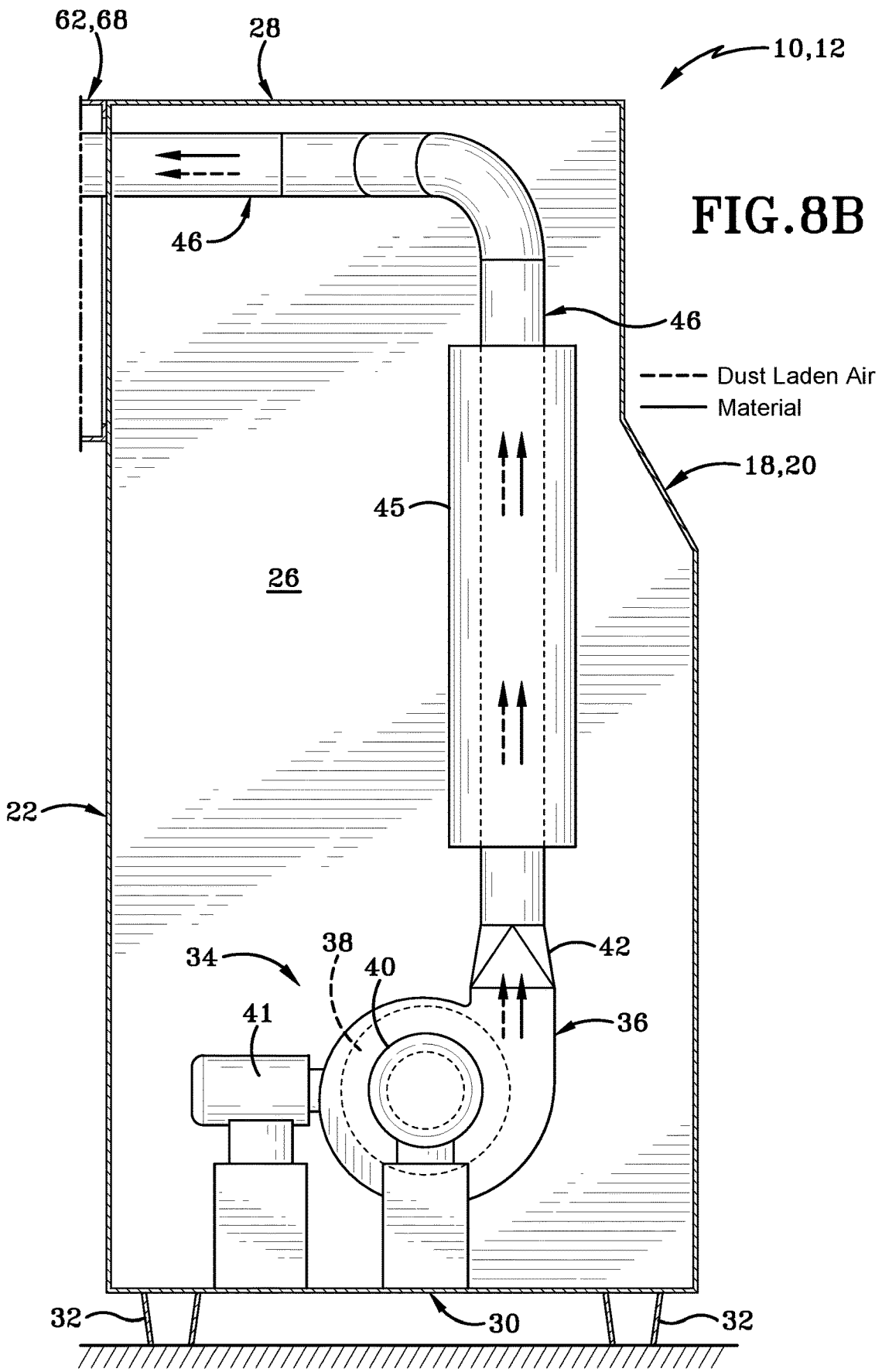
FIG. 8B (FIG. 8B) is a front elevation cross section operational view of a blower assembly of a material separator, according to one aspect of the present disclosure.

With reference now to FIG. 8B, the material laden air and waste material is shown moving through blower housing 36 and coupler 42 and into outlet conduit 46. The material laden air and waste material may then travel through the noise suppressor 45 before continuing on through conduit 46 towards the separator assembly 14.

Figure 8D:
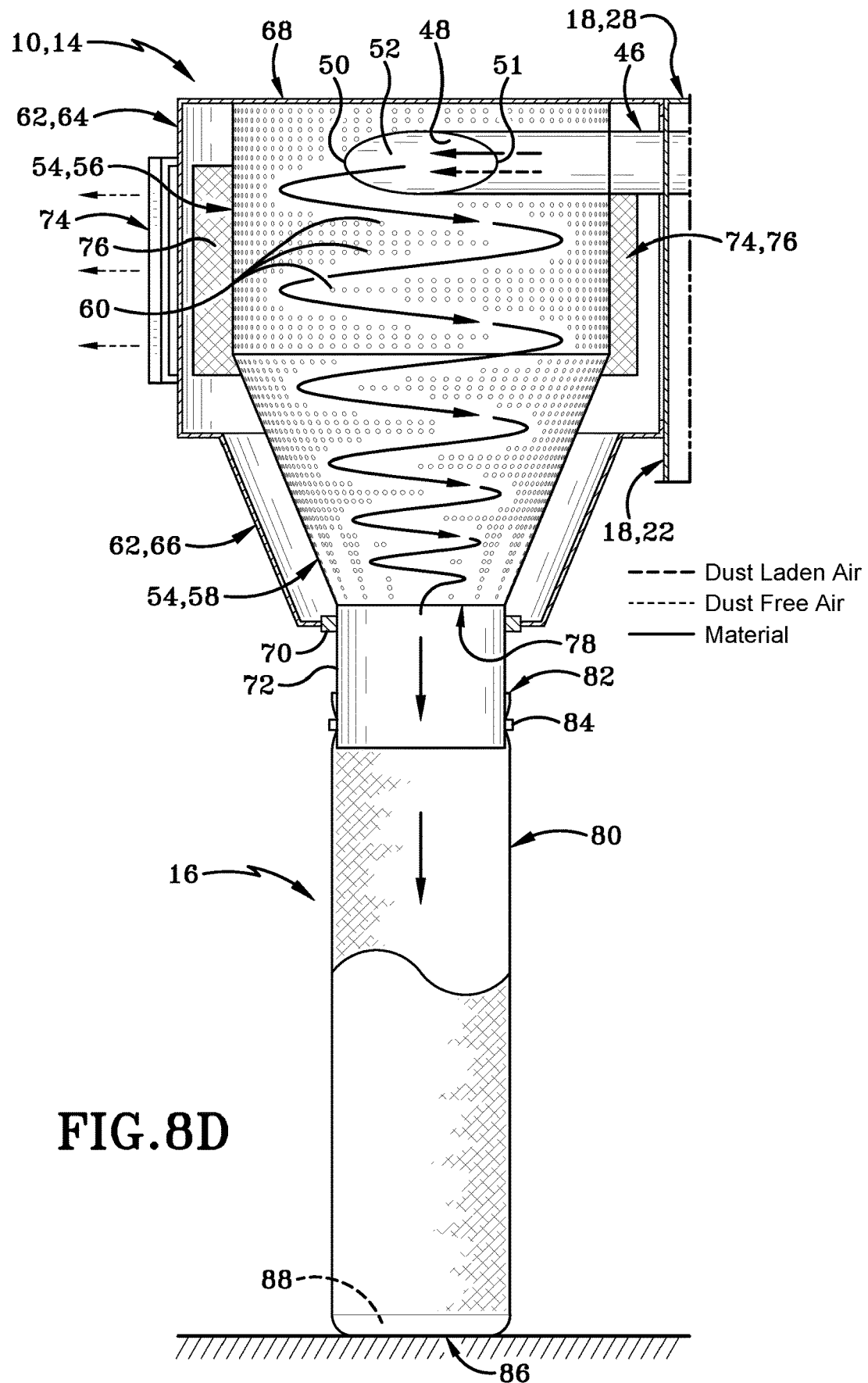
FIG. 8D (FIG. 8D) is a front elevation cross section operational view of a separator and collection assembly of a material separator, according to one aspect of the present disclosure.

With reference to FIGS. 8C and 8D, as the material laden air and waste material exits through outlet aperture 48 of outlet conduit 46, the shape and angle of tip 50 and side wall 52 may cause the material laden air and waste material to swirl within the upper portion 56 of cylindrical receiver 54. Specifically, material laden air and waste material exiting conduit 46 closer to the edge 51 of outlet aperture 48 will begin to disperse into the cylindrical receiver 54 while material laden air and waste material exiting the aperture 48 near the extended sidewall 52 and tip 50 of outlet aperture 48 may be propelled by the pressure of the material laden air and waste material behind it within conduit 46. This may cause the material laden air and waste material closer to extended sidewall 52 to enter cylindrical receiver 54 at a higher velocity, thus further facilitating the spiraling movement of material laden air and waste material within the cylindrical receiver 54. As the material laden air and waste material swirls, the air will begin to escape the cylindrical receiver 54 through perforations 60 and will disperse outwardly into the housing 62 of separator assembly 14. Simultaneously, the waste material will continue to swirl within cylindrical receiver 54 and will begin to settle downwards towards the bottom opening of central chamber 78. This is best seen in FIGS. 8C and 8D as illustrated by the solid tail arrows within the central chamber 78.

The material laden air moving through perforations 60, by definition, still contains dust particles small enough to pass through perforations 60 in cylindrical receiver 54. This is again indicated by the arrows with larger dashed line tails in FIG. 8C. As this material laden air is dispersed throughout upper section 64 of housing 62, it may pass through the vents 74 where the dust and smaller waste material particles may be trapped by filter 76 allowing the air to be scrubbed clean of dust and smaller particles before being returned to the environment outside of material separator 10 as clean air (as again indicated by the arrows with fine dashed line tails shown exiting vents 74 in FIGS. 8C and 8D).

Simultaneously, as air and material continues to spiral within cylindrical receiver 54, material too large to pass through perforations 60 will gradually slow down and settle through action of gravity and into the lower portion 58 of cylindrical receiver 54. As this material slows, it will eventually fall through the bottom opening of central chamber 78 and through collar 72 before entering the collection bag 80 through the open end 82 thereof. Any air still within lower portion 58 of cylindrical receiver 54 may continue to escape through perforations 60 and into the housing 62 of separator assembly 14. As mentioned above, the conical shape of lower section 66 of housing 62, coupled with the absence of vents therethrough, may further direct this air up and back into upper section 64 where it may pass through vents 74 to filter out any additional dust or fine particles with filter 76 while larger waste material is separated therefrom and falls into collection bag 80.

As mentioned above, collection bag 80 may be formed of a material to allow air to pass therethrough thus allowing any final downdrafts of air moving into the collection bag 80 to disperse therethrough while the bag 80 may further trap any additional dust or fine particle, either through its own construction or through the utilization of additional filters, as dictated by the desired implementation.

As bag 80 then fills with material, it may be removed from collar 72 by disengaging fastener device 84 and removing the open end 82 of bag 80 therefrom before emptying and/or replacing bag 80 on collar 72 and reconnecting fastener device 84.

As material separator 10 is a wholly self-contained material transport and separating assembly, the whole of material separator 10 may be moved to operate in conjunction with any suitable waste material source and may provide industrial grade waste material separation systems that need not be integrated into the building or facility housing the specific equipment and may further allow for flexibility in floor plan and arrangement while simultaneously providing an efficient and inexpensive solution to waste material handling.

Similarly, material separator 10 may be scaled in size for larger or smaller applications and may be utilized in smaller shops and/or hobbyist-type installations while still providing an efficient and cost-effective waste material handling solution.

As described herein, aspects of the present disclosure may include one or more electrical, pneumatic, hydraulic, or other similar secondary components and/or systems therein. The present disclosure is therefore contemplated and will be understood to include any necessary operational components thereof. For example, electrical components will be understood to include any suitable and necessary wiring, fuses, or the like for normal operation thereof. Similarly, any pneumatic systems provided may include any secondary or peripheral components such as air hoses, compressors, valves, meters, or the like. It will be further understood that any connections between various components not explicitly described herein may be made through any suitable means including mechanical fasteners, or more permanent attachment means, such as welding or the like. Alternatively, where feasible and/or desirable, various components of the present disclosure may be integrally formed as a single unit.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. An apparatus for separating waste material from a flow of air comprising:
    a housing;
    a receiver contained within the housing;
    a central chamber defined through the interior of the receiver, the central chamber having an open bottom;
    a conduit in operable communication with the central chamber, the conduit operable to deliver a flow of air and waste material into the central chamber;
    a plurality of perforations defined in the receiver operable to allow air to move from the central chamber into the housing;
    at least one vent defined through the housing, the at least one vent operable to allow the air from the central chamber to exit the housing into the exterior environment; and
    a collection assembly operable to collect the waste material as it exits the central chamber through the open bottom thereof.

2. The apparatus of claim 1, wherein the receiver further comprises:
    an upper cylindrical portion; and
    a lower conical portion, wherein the central chamber extends through both the upper cylindrical portion and the lower conical portion.

3. The apparatus of claim 2, wherein the upper cylindrical portion of the receiver has a first height and the lower conical portion of the receiver has a second height, the first and the second height equal to a total height of the of the receiver.

4. The apparatus of claim 3, wherein the first height and the second height are equal and are each one half of the total height of the receiver.

5. The apparatus of claim 2, wherein the upper cylindrical portion of the cylindrical receiver has a first diameter and the lower conical portion of the cylindrical receiver tapers from the first diameter down to a second diameter that is less than one half of the first diameter.

6. The apparatus of claim 5, wherein the taper of the lower conical portion is operable to direct material from the upper cylindrical portion into the collection bag.

7. The apparatus of claim 2, wherein the first diameter is in a range of thirty-six to sixty inches.

8. The apparatus of claim 7, wherein the second diameter is sixteen inches.

9. The apparatus of claim 1, wherein the conduit further comprises:
   a vacuum operable to draw air and waste material from an associated machine into the conduit; and
   a material fan operable to reduce the size of waste material entering the conduit and to direct the air and waste material from the vacuum to the receiver.

10. The apparatus of claim 1, wherein the at least one vent further comprises:
    a filter medium operable to filter dust out of the air passing through the at least one vent.

11. The apparatus of claim 10, wherein the filter medium further comprises:
    a high efficiency particulate air filter.

12. A method of separating waste material comprising:
    providing a receiver of a separator assembly inside of a housing;
    delivering air containing waste material into the receiver of the separator assembly;
    causing the air and waste material to swirl within a central chamber defined in the receiver;
    venting the air out of the receiver through a plurality of perforations defined therein and into the housing;
    directing the waste material down through a lower conical portion of the receiver; and
    collecting the waste material that falls through the lower conical portion of the cylindrical receiver in a collection bag.

13. The method of claim 12, further comprising:
    venting the air passing through the plurality of perforations defined in the receiver out of at least one vent defined through the housing of the separator assembly.

14. The method of claim 13, further comprising:
    filtering the air passing through the at least one vent through a filter medium.

15. The method of claim 14, wherein the filter medium further comprises:
    a high efficiency particulate air filter.

16. The method of claim 12, wherein delivering the air containing the waste material into the receiver further comprises:
    drawing the air and waste material from an associated machine into a conduit with a vacuum;
    reducing the size of the waste material entering the conduit with a material fan; and
    directing the air and waste material from the vacuum to the receiver through the conduit.

17. The method of claim 16, wherein the waste material is an industrial by-product waste material further comprising:
    at least one of saw dust, plastic waste, and metal swarf.

18. The method of claim 12, wherein causing the air and waste material to swirl within the central chamber further comprises:
    delivering the air and waste material under pressure through a conduit and into the central chamber.

19. The method of claim 18, wherein delivering the air and waste material under pressure through the conduit further comprises:
    delivering the air and waste material into the central chamber through an angled outlet aperture of the conduit; and
    causing a first portion of the air and waste material to exit the outlet aperture of the conduit at a first edge thereof.

20. The method of claim 19, further comprising:
    causing a second portion of the air and waste material to exit the outlet aperture at a tip thereof, wherein the second portion has a higher velocity when it exits the outlet aperture at the tip relative to a velocity of the first portion as it exits the outlet aperture at the first edge.

21. An apparatus for separating waste material from a flow of air comprising:
    a housing;
    a receiver contained within the housing;
    a central chamber defined through the interior of the receiver, the central chamber having an open bottom;
    a plurality of perforations defined in the receiver operable to allow air to move from the central chamber into the housing; and
    a collection assembly operable to collect the waste material as it exits the central chamber through the open bottom thereof.

22. The apparatus of claim 21, further comprising:
    at least one vent defined through the housing, the at least one vent operable to allow the air from the central chamber to exit the housing into the exterior environment.

23. The apparatus of claim 21, further comprising:
    a conduit in operable communication with the central chamber, the conduit operable to deliver a flow of air and waste material into the central chamber.

* * * * *